United States Patent
Döttling et al.

(10) Patent No.: US 8,433,356 B2
(45) Date of Patent: Apr. 30, 2013

(54) METHOD FOR TRANSMITTING DATA PACKETS

(75) Inventors: Martin Döttling, Neubiberg (DE); Jürgen Michel, München (DE); Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 957 days.

(21) Appl. No.: 11/793,922

(22) PCT Filed: Dec. 20, 2005

(86) PCT No.: PCT/EP2005/056949
§ 371 (c)(1),
(2), (4) Date: Jun. 22, 2007

(87) PCT Pub. No.: WO2006/067137
PCT Pub. Date: Jun. 29, 2006

(65) Prior Publication Data
US 2008/0130533 A1  Jun. 5, 2008

(30) Foreign Application Priority Data
Dec. 22, 2004 (DE) .......... 10 2004 061 905

(51) Int. Cl.
*H04B 7/00* (2006.01)
(52) U.S. Cl.
USPC .......................................... 455/522
(58) Field of Classification Search .......... 55/522; 554/522
See application file for complete search history.

(56) References Cited

U.S. PATENT DOCUMENTS

| | | | |
|---|---|---|---|
| 6,707,806 B1* | 3/2004 | Kato | 370/336 |
| 7,016,364 B2* | 3/2006 | Cox et al. | 370/412 |
| 7,369,521 B2* | 5/2008 | Frederiksen et al. | 370/318 |

(Continued)

FOREIGN PATENT DOCUMENTS

| | | |
|---|---|---|
| EP | 1 315 309 | 5/2003 |
| WO | WO 03/017524 | 2/2003 |
| WO | WO/2004/075559 | 1/2004 |
| WO | 2004/100393 A2 | 11/2004 |

OTHER PUBLICATIONS

"3rd Generation Partnership Project; Technical Specification Group Radio Access Network; Feaibility Study for Enhanced Uplink for UTRA FDD; (Release 6)" 3GPP TR 25.896 V2.0.0, Mar. 2004.

*Primary Examiner* — Marisol Figueroa
(74) *Attorney, Agent, or Firm* — Staas & Halsey LLP

(57) ABSTRACT

A method transmits data packets in a radio system between an emitter and a receiver. A nominal energy is defined for each data packet and each transmission according to a quality requirement for the reception by the receiver. An emission power required for each data packet is determined according to the quality requirement for the reception of the data packet. The transmission data packet is formed from a plurality of data packets. A first transmission emission power is defined for a first transmission of the transmission data packet according to the determined emission powers for the individual data packet. The first transmission of the transmission data packet is carried out with the first transmission emission power. A retransmission emission power is calculated according to a nominal transmission power derived from the nominal energy, for the transmission data packet and the emission power for at least one previous transmission of the transmission data packet.

16 Claims, 2 Drawing Sheets

U.S. PATENT DOCUMENTS

2004/0137931 A1    7/2004  Sarkar et al.
2004/0203457 A1*  10/2004  Rikola et al. ............... 455/67.13
2007/0015528 A1    1/2007  Nemethova et al.

\* cited by examiner

METHOD FOR TRANSMITTING DATA PACKETS

CROSS REFERENCE TO RELATED APPLICATIONS

This application is based on and hereby claims priority to PCT Application No. PCT/EP2005/056949 filed on Dec. 20, 2005 and German Application No. 10 2004 061 905.0 filed on Dec. 22, 2004, the contents of which are hereby incorporated by reference.

BACKGROUND

The invention relates to a method for transmitting data packets in a radio system and to a corresponding communication device, a base station, and the corresponding radio system.

For the UMTS (Universal Mobile Telecommunication System) Enhanced Uplink between a mobile station and a base station offering a high transmission capacity it is provided for a plurality of data streams, termed MAC-D flows, to be combined into one what is termed MAC-E flow. Said MAC-E flow is then transmitted at a specific transmitter power both in the initial transmission or, as the case may be, first transmission and in possible repeat transmissions. It is not therein provided for the individual MAC-D packets within an MAC-E packet to be transmitted at a different power and with a different probability of detection. That would require additional effort because the MAC-D packets would all have to be independently decodable and would each need to be given an independent checksum. It would furthermore have to be signaled independently how many MAC-D packets of what length are contained.

The individual data streams can be assigned to different services, for example to a video transmission or voice transmissions. The individual services in part require different qualities of service (QoS) defined in terms of, for instance, bit rate or frame-error rate or delay. To insure an adequate quality of service, the maximum is selected from the transmitter powers for the in each case individual services as the transmitter power for the combined MAC-E flow. It is then thereby insured that the necessary quality of service will be achieved for each individual MAC-D flow.

SUMMARY

One possible object is to provide an alternative to this related art.

When data packets are transmitted between a transmitter and a receiver it is provided for a plurality of data packets, which is to say at least two thereof, to be combined into one transmission data packet for transmission purposes.

Before the method is explained further, the following is to be noted for the purpose only of better understanding the method, not limiting its application range:

In particular a specific overall energy or, as the case may be, nominal energy is required for each transmitted data packet so that the data packet can with a predefined probability be processed correctly. Said overall energy can be provided by a single transmission at a high transmitter power or multiple transmissions at a low transmitter power. There will in the former case be a slight delay until the predefined probability has been attained, with, though, usually undesired interferences due to the high transmitter power having to be accepted at the same time. Meeting the "overall-energy requirement" in the case of only a single transmission will hence be considered only for situations subject to stringent quality requirements, in particular stringent requirements in terms of a short delay. There will in the latter aforementioned case be less interference accompanied by a longer delay. Multiple transmissions will therefore be considered for situations not subject to particularly stringent quality requirements. By optimizing the transmitter powers for the transmissions, an optimal profile can be found that constitutes a best possible compromise between probability of reception and delay and the interference produced. The requirements for different services being themselves generally different, the optimal transmitter power will depend both on the transmitted service and on the transmission (or transmission number, which is to say the first transmission, second, third . . . ).

For each individual data packet an individual transmitter power is therefore required that is determined as a function of a required quality upon reception of the data packet.

A first transmission of the transmission data packet formed from at least two data packets takes place at a first-transmission transmitter power. Said power is, for example, signaled by the receiver to the transmitter or determined by the transmitter as, for example, the maximum of the individual transmitter powers for individual data packets.

A repeat-transmission power is then determined in preparation for a possibly required repeat transmission. That is done taking account of the required overall energy and of the already conveyed energy defined by the transmitter power of the previous transmissions of the transmission data packet.

That has the advantage that only as much energy as is actually required will be used for a possibly necessary repeat transmission. The capacity of a data transmission will be increased thereby and unnecessary interferences avoided.

The transmitter will in particular be notified by the receiver if the receive quality is inadequate for one or more data packets, whereupon the transmitter will send the transmission data packet at the repeat-transmission power.

A communication device for implementing a method of such type and to a central network element and a radio system are also disclosed.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
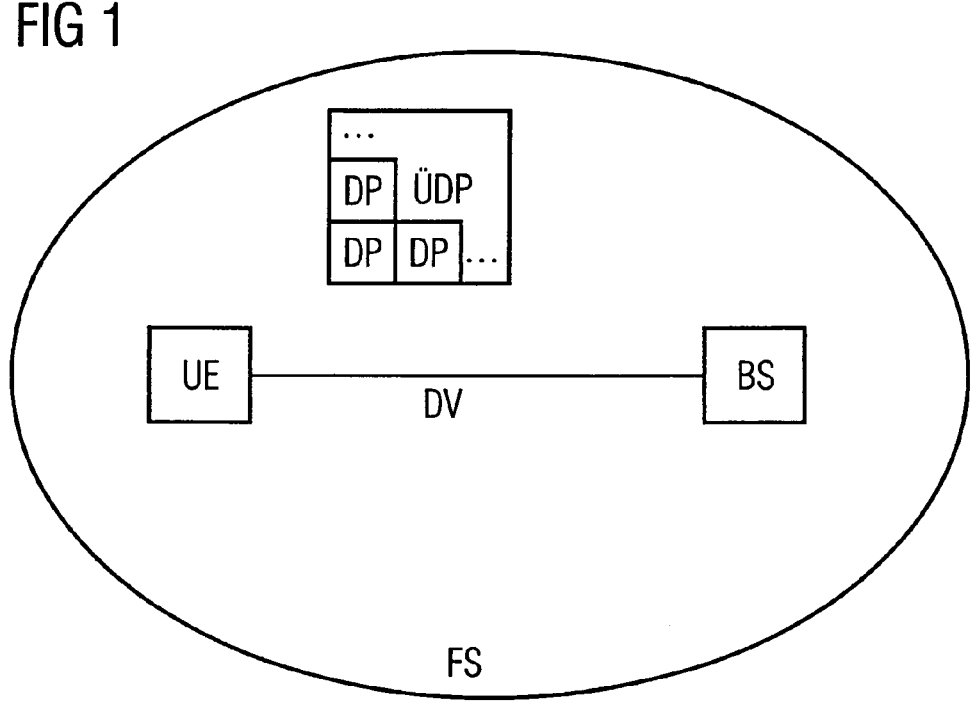
FIG. 1 shows a transmission of data packets in a radio system.

Reference will now be made in detail to the preferred embodiments of the present invention, examples of which are illustrated in the accompanying drawings, wherein like reference numerals refer to like elements throughout.

FIG. 1 shows a transmission of data packets in a radio system FS between a mobile station UE as the transmitter and a base station BS as the receiver. The data packets DP are combined into one transmission data packet UDP and transmitted over a data connection DV.

The radio system FS or communication network or communication system is a structure for exchanging data. It can therein be, for example, a cellular mobile-radio network such as, say, the GSM (GSM: Global System for Mobile communication) network or the UMTS (UMTS: Universal Mobile Telecommunications System) network.

The radio system FS includes at least two connecting nodes, so what are termed point-to-point connections are also encompassed within this term. Mobile stations UE that are connected to one another via a radio interface are generally provided in a radio system FS. In the UMTS the radio system FS has at least base stations, here also called Node B, and radio-network controllers (RNC) for connecting the individual base stations. The Universal Terrestrial Radio Access Network UTRAN is the radio part of a UMTS network in which, for example, the radio interface is also made available. A radio interface is always standardized and defines the totality of the physical and protocol-related specifications for exchanging data, for example the modulation method, bandwidth, frequency deviation, access methods, security procedures, and also switching techniques. The UTRAN thus includes at least base stations and at least one RNC.

Base stations are—alongside RNCs etc.—to be understood as central units in a communication network CN which, in the case of a cellular mobile-radio network, serve mobile stations or communication devices within a cell, for example the first cell or the second cell, via one or more radio channels. The base station provides the air interface between the base station and mobile station, for which purpose it includes at least one sending and/or receiving unit.

A communication device UE, in particular a mobile station or terminal, can be any communication terminal via which a user communicates in a radio system FS. Examples include mobile-radio terminals, such as mobile telephones, and portable computers having a radio module. A mobile station is in the UMTS often referred to also as user equipment.

A distinction is made in mobile radio between two connection directions. "Downlink" (DL) is the term employed for the transmission direction from the base station to the mobile station. "Uplink" (UL) is the term employed for the opposite transmission direction from the mobile station to the base station.

In broadband transmission systems such as, for example, a UMTS mobile radio network, a channel is part of an available overall transmission capacity, for example of a frequency range. A wireless communication path is within the scope of this patent application referred to as a radio channel or channel.

Two types of channels are provided for the transmission of data in a mobile-radio system, for example UMTS: Dedicated channels and common channels. With the dedicated channels a physical resource is reserved only for one specific mobile station for the transmission of information. With the common channels such as, for example, the primary common control physical channel PCCPCH in the downlink, it is possible to transmit information that is intended for all terminals, or else all mobile stations share said physical resource.

The E-DCH via which a mobile station is allowed to send data to the base station having obtained permission therefrom to transmit can be regarded as a kind of hybrid. The E-DCH is on the one hand a dedicated channel as it connects precisely one mobile station to one or more base stations; on the other hand, permission to transmit is granted by the base station as in the case of a common channel. Said permission is necessary so that the signal level at the base station will not become too high for the station to be able to perfectly decode the signals received from different mobile stations.

A transmission data packet ÜDP therefore includes a plurality of individual data packets DP, which is to say at least two thereof. The individual data packets DP can be assigned to different services and hence to different MAC-D flows. The transmission quality is consequently subject to different requirements. To achieve a specific transmission quality or a specific probability of reception, a data packet must arrive at the receiver having a specific "overall energy". Said overall energy can also be achieved in a plurality of transmissions as the sum of the energies of single transmissions, because it is assumed here that the receiver will gather up all the single transmissions in order to decode the packet. Processing of this kind is also called "soft combining", with the received data being gathered up before decoding is performed. It is in this way possible to achieve a significantly better performance than if account were in each case taken of only one individual transmission. That, though, of course requires past transmissions to be stored for such periods as decoding has not been possible. Said storing takes place in, for example, what is termed a soft buffer in which received signals are buffered.

Figure 2:
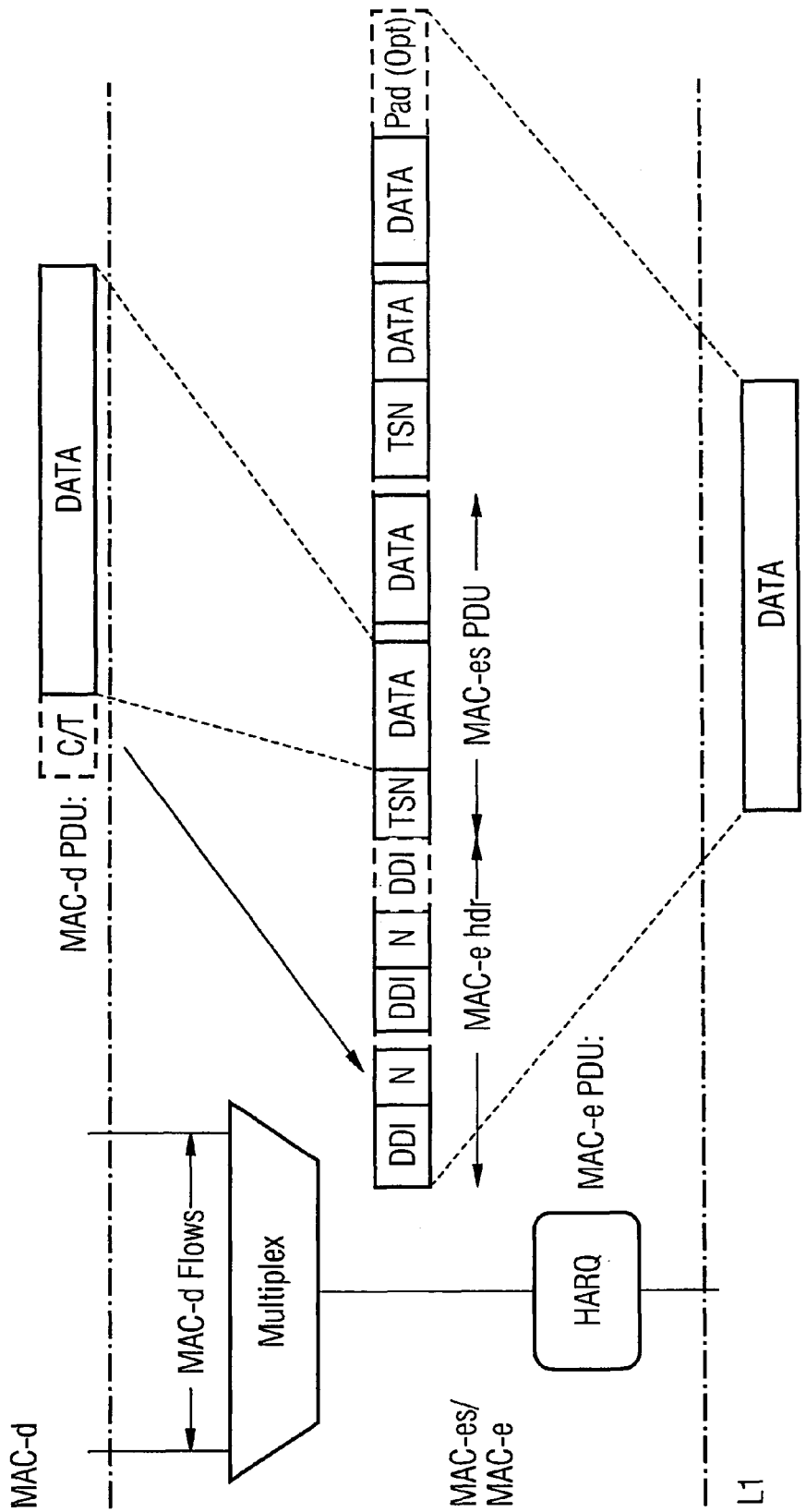
FIG. 2 shows the multiplex structure of MAC-E and MAC-D (on the left) and the composition of the corresponding data packets (on the right).

Examples relating to the UMTS system are described below, with the layer structure provided for implementing the fast uplink channel E-DCH being explained first with the aid of FIG. 2:

FIG. 2 shows the multiplex structure for the UMTS Enhanced Uplink from a mobile station to a base station. A plurality of data streams, also called MAC-D flows, are therein combined into one what is termed MAC-E flow, which is then transmitted at a specific transmitter power both in the first transmission and in the possible repeat transmissions. FIG. 2 shows the physical layer L1 containing the data "DATA" in a kind of "raw-data format". What is termed the "medium access control" (MAC) layer is for the purpose of the UMTS Enhanced Uplink divided into what is termed the MAC-d layer and the MAC-es/MAC-e layer. The MAC-e layer is inserted to improve the UMTS uplink transmission. It executes what is termed the HARQ (Hybrid ARQ) protocol, with packets continuing to be repeated until there is a negative acknowledgement (NACK, Not Acknowledge) or, as the case may be, a positive acknowledgement (ACK).

One embodiment relating to the example, cited in the introduction, having the MAC-E and MAC-D flows takes into account of when a past MAC-D flow, i.e. in an earlier transmission of a data packet assigned to said MAC-D flow, has already been given more energy than would have been necessary for attaining its QoS objective or quality requirement. That can be done by combining the flows if the quality requirements for the individual services in each case combined in one MAC-D flow are different.

Said additional or excessive energy will be taken into account in the ensuing repeat transmission. The energy currently used will for that purpose be determined on the basis not of a predefined energy for the current repeat transmission but of a predefined cumulative energy (or a targeted cumulative transmission power) of the energy requiring to be used until the waiting repeat transmission. The energies from the past transmissions of the transmission data packet are employed for calculating the cumulative energy.

The energy is determined from the transmitter power and the transmission time for the data packet.

That procedure will yield better results, which is to say less interference with the same quality of service, particularly when the different MAC-D flows have different energy requirements for repeat transmissions in relation to the first transmission (first packet) or, as the case may be, in relation to other repeat transmissions because, for example, the energy for repeat transmissions is to be reduced for one flow but not for others.

The following procedure in particular is provided for determining the transmitter power of the different transmissions:

1. The maximum of the predefined transmitter powers of all MAC-D flows is used as the transmitter power P(1) for the first transmission k=1:

$$P(1) = \max_i \{P_t(1, i)\}$$

where i stands for the individual different MAC-D flows. The nominal transmitter power $P_t(1, i)$ within an MAC-D flow is always the same for all data packets belonging to said MAC-D flow.

2. For the repeat transmission k>1 the difference $\Delta P(k, i)$ between the targeted cumulative power $P_t(k,i)$ after k transmissions and the (actual previous) cumulative power is calculated for each MAC-D flow i across all previous transmissions P(m) in the transmission m (m runs from 1 to k−1):

$$\Delta P(k, i) = P_t(k, i) - \sum_{m=1}^{k-1} P(m)$$

3. The transmitter power requiring to be used for the transmission data packet of the k-th transmission or the k-th repeat transmission transmitter power is calculated as the maximum of the differential powers $\Delta P(k, i)$, with the maximum being formed across all MAC-D flows.

$$P(k) = \max_i \{\Delta P(k, i)\}$$

4. Corrections can moreover also be taken into account for the transmitter power of the k-th transmission. Said corrections are in the simplest and preferred case not present. The correction factors can, though, generally, compensate influences due to changed temporal diversity and due to the reciprocal impact of an energy shift and simultaneous use of incremental redundancy (allowing for the improvement in coding gain).

Steps 2., 3., and 4. are executed sequentially for ascending transmission numbers k=2, . . . , K, where K is the maximum number of transmissions.

The advantage of this type of solution is that not too much power is used so that unnecessary interference that would reduce system performance is avoided. In particular, matching the transmitter power extends the operating time of the rechargeable batteries in the terminal without undershooting the respectively required qualities of service. These advantages are achieved at no appreciable additional effort. The differences between a procedure according to the related art and according to embodiments will be illustrated with the aid of further examples.

For an instance having two MAC-D flows, tables 1 and 2 show the power respectively employed in the resulting MAC-E flow. Listed in the MAC-D flows row are in each case the nominal transmitter power of the current transmission and, in parentheses, in each case thereunder the resulting cumulative power of all nominal transmitter powers of the previous transmissions.

The nominal transmitter powers for the individual MAC-D flows are therein theoretical only and not themselves employed because data packets belonging to individual MAC-D flows are, of course, combined for the transmission into transmission packets that belong to the MAC-E flow. Only one (common) power can be used for a transmission packet of said type.

The powers are shown standardized, which is to say the nominal transmitter power of the first transmission of the first MAC-D flow is set to 1. According to the previous procedure, as shown in table 1, the respectively maximum power requirement for each transmission will prevail and after 2 transmissions the standardized cumulative power 1.5 will have been emitted (Cumulative power row for MAC-E) although a cumulative power of only 1.25 would have been required. Thus 20% too much power is used. Too much power is used also in the 3rd transmission so that the standardized cumulative power is 2.0 instead of 1.5, i.e. 33% too much.

TABLE 1

Standardized MAC-D and resulting MAC-E flow power according to the previous method

| | Transmission | | | |
|---|---|---|---|---|
| | 1 | 2 | 3 | 4 |
| MAC-D flow 1 Nominal transmitter power (cumulative transmitter power) | 1 (1) | 0.25 (1.25) | 0.25 (1.5) | 1 (2.5) |
| MAC-D flow 2 Nominal transmitter power (cumulative transmitter power) | 0.5 (0.5) | 0.5 (1.0) | 0.5 (1.5) | 0.5 (2.0) |
| MAC-E flow Transmitter power | 1 | 0.5 | 0.5 | 1 |
| MAC-E flow Cumulative power | 1 | 1.5 | 2.0 | 3 |

TABLE 2

Standardized MAC-D and resulting MAC-E flow power according to the novel method

| | Transmission | | | |
|---|---|---|---|---|
| | 1 | 2 | 3 | 4 |
| MAC-D flow 1 Nominal transmitter power (cumulative transmitter power) | 1 (1) | 0.25 (1.25) | 0.25 (1.5) | 1 (2.5) |
| MAC-D flow 2 Nominal transmitter power (cumulative transmitter power) | 0.5 (0.5) | 0.5 (1.0) | 0.5 (1.5) | 0.5 (2.0) |
| MAC-E flow Transmitter power | 1 | 0.25 | 0.25 | 1 |
| MAC-E flow Cumulative power | 1 | 1.25 | 1.5 | 2.5 |

Shown in table 2 is an embodiment wherein no correction factors have been used (see above under item 4). Used in each transmission is precisely the MAC-E flow power that just meets the cumulative power criterion for all MAC-D flows. The transmitted power is thus minimized. The targeted QoS requirements are nonetheless achieved for all channels and for each repeat transmission.

Expressed another way, the transmitter power is according to the related art calculated for a transmission from the maximum of the provided (nominal) transmitter powers of the individual packets. What, though, is calculated is a targeted cumulative power of the individual packets for the individual transmissions from the provided transmitter powers of individual packets for the individual transmissions. The transmitter power of the overall packet is then formed as the maximum of the provided cumulative powers of the individual packets and the transmitter power for the transmission is calculated from the difference between said cumulative power and the cumulative power of the previous transmission. The same result will be obtained if the difference between the previous overall cumulative power (for the MAC-D packet) and the provided cumulative power for said packet (this MAC-E flow) is calculated for each individual packet and then the maximum of said differences used. It is noted here that an individual difference can therein also turn out to be negative, in which case the maximum of the differences will be the largest positive difference and not, say, the largest difference in terms of amount, which could also be negative, of course.

The following is also noted: It may indeed happen that through being co-multiplexed with other flows an MAC-D flow will undergo such an intense increase in energy that the cumulative-power criterion for a repeat transmission will have been met even before said repeat transmission takes place. A flow of said type would hence according to the cumulative-power criterion not have to be transmitted at all, which, though, is not conducive to the aim because the transmission packets would then have to be regenerated, thereby giving rise to additional effort.

That cannot, however, when a plurality of MAC-D flows have been combined into one MAC-E flow occur simultaneously with all MAC-D flows because there will then always be one flow whose cumulative-power criterion has just been met in the previous (first or repeat) transmission, which is to say it is necessary to transmit at least at the nominal power of said flow for the current repeat transmission because excessive energy was not used for said flow for the previous transmission.

According to another exemplary embodiment a minimum power at which a transmission is at least to take place is additionally specified for each repeat transmission. The maximum from the energy calculation according to the above method and from the individual minimum powers of the MAC-D flows is then used. Said minimum power can be selected as being the same for each repeat transmission. The minimum power can alternatively be selected as being a fraction of the provided transmission power of an MAC-D flow for said repeat transmission.

It is noted that the different flows and hence the associated data packets can belong either to one and the same service or to different services. It is basically only relevant that different quality requirements are placed on individual data packets within the transmission data packet.

What is understood within the scope of the patent application by a "service" is a specific application such as a voice transmission or a video transmission.

A very simple procedure uses the difference in relation to the as yet missing part, as was illustrated above with the aid of the tables, to determine the transmitter power for the repeat data packets.

Methods are furthermore provided whereby a compromise is reached between the previous procedure and the difference, for example with the minimum being formed from the difference and half the nominal power, or similar functions.

What is understood within the scope of the patent application by a "nominal power" is the power that would be used for a repeat transmission for an MAC-D packet if only that packet were to be transmitted in the MAC-E.

Within the scope of the description, mention has hitherto been made primarily of the transmitter power requiring to be selected but which can be adapted through various correction values. The transmission energy can alternatively also be used. If the duration of transmission is the same for all packets, then there will always be a fixed ratio between power and energy, otherwise the duration of transmission will need to be taken into account. Instead of the transmitter power it is furthermore also possible to use the receive power at the receiver. That is applied also in the case of UMTS. What is termed a pilot channel is therein sent that is controlled in terms of its power by power-control commands transmitted from the receiver to the transmitter. What is achieved thereby is that the pilot channel will be received at a specified power. A predefined receive power for a data channel is then achieved in such a way that a power ratio between the data channel and pilot channel is set in the transmitter such that the required receive power will be achieved in the receiver. If that method is selected, then what is to be understood as the transmitter power within the meaning is the transmitter power in relation to the power of the pilot channel.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for transmitting data packets in a radio system between a transmitter and a receiver, wherein for each data packet and each transmission, a nominal energy is predefined as a function of a quality requirement for reception at the receiver, comprising:
   determining a transmitter power required for each data packet through the function of the quality requirement for reception of each data packet; at least two of the data packets being assigned to different services;
   forming a transmission data packet from a plurality of data packets;
   specifying a first-transmission transmitter power for a first transmission of the transmission data packet as a function of the determined transmitter power for each data packet;
   transmitting the transmission data packet at the first-transmission transmitter power; and
   deriving a repeat-transmission transmitter power as a function of a nominal transmission power derived from the nominal energy required for the transmission data packet and from the transmitter power required for at least one previous transmission of the transmission data packet.

2. The method as claimed in claim 1, wherein
   the transmitter power for the transmission data packet is based on a maximum required transmitter power for one data packet in the plurality of data packets.

3. The method as claimed in claim 1, wherein
   the repeat-transmission transmitter power is first derived from the difference between the nominal transmission power for the transmission data packet and the sum of each transmitter power required for previous transmission of the transmission data packet.

4. The method as claimed in claim 1, wherein a targeted cumulative transmission power $P_t(k, i)$ is calculated from the sum of transmission power required for an individual transmission of an individual data packet.

5. The method as claimed in claim 3, wherein a targeted cumulative transmission power is calculated from the sum of transmission power required for an individual transmission of an individual data packet, for repeat transmissions, a difference $\Delta P(k, i)$ between the targeted cumulative transmission power after k transmissions and an actual previous cumulative transmission power is determined by:

$$\Delta P(k, i) = P_t(k, i) - \sum_{m=1}^{k-1} P(m),$$

where k is the repeat transmission, i is a group of data packets subject to the same quality requirement, and $P_t(k,i)$ is the targeted cumulative power for the k-th transmission and i-th group.

6. The method as claimed in claim 4, wherein the repeat-transmission transmitter power is calculated from the sum of the difference between the targeted cumulative power and the sum of the transmission power required for transmission of each data packet in the plurality of data packets.

7. The method as claimed in claim 1, wherein
the quality requirement indicates a maximal permissible delay or a probability of decoding by the receiver.

8. The method as claimed in claim 1, wherein
a cumulative transmission power is derived from the transmitter power required for the transmission data packet.

9. The method as claimed in claim 1, wherein
a plurality of services are offered in the radio system and the quality requirement is specified as a function of the services.

10. The method as claimed in claim 9, wherein
each of the plurality of services is assigned a data connection in which individual data packets represent data in the data stream in chronological order.

11. The method as claimed in claim 5, wherein a group is assigned to a specific service.

12. The method as claimed in claim 1, wherein the nominal transmission power or at least one parameter for determining the nominal transmission power is signaled by the receiver.

13. The method as claimed in claim 1, further comprising:
receiving information about a quality of reception of the transmission data packet from the receiver of the transmission data packet; and
repeatedly sending the transmission data packet as a function of the information.

14. The method as claimed in claim 13, wherein at least one further repeat-transmission transmitter power is derived as a function of the nominal transmission power and of the transmitter powers of the previous transmissions.

15. A communication device, comprising:
a sending/receiving unit for sending and receiving data packets; and
a processor unit for implementing the method for transmitting data packets according to claim 1.

16. A radio system, comprising:
a communication device, comprising:
a sending/receiving unit for sending and receiving data packets; and
a processor unit for implementing the method for transmitting data packets according to claim 1; and
a base station, comprising:
a sending/receiving unit for sending and receiving data packets; and
a processor unit set up for implementing a method comprising:
conveying a nominal cumulative transmission power or at least one parameter for determining the nominal cumulative transmission power;
receiving transmission data packets;
decoding transmission data packets; and
dividing the transmission data packets into data packets.

* * * * *

UNITED STATES PATENT AND TRADEMARK OFFICE
CERTIFICATE OF CORRECTION

PATENT NO. : 8,433,356 B2
APPLICATION NO. : 11/793922
DATED : April 30, 2013
INVENTOR(S) : Martin Doettling et al.

It is certified that error appears in the above-identified patent and that said Letters Patent is hereby corrected as shown below:

In the Claims:

Column 8, line 37, In Claim 1, delete "packet;" and insert -- packet, --, therefor.

Signed and Sealed this
Thirteenth Day of August, 2013

Teresa Stanek Rea
*Acting Director of the United States Patent and Trademark Office*